United States Patent
Villanueva et al.

(10) Patent No.: US 8,304,360 B2
(45) Date of Patent: Nov. 6, 2012

(54) HIGH STRENGTH CLAY BLEND FOR SANITARY WARE

(75) Inventors: Victor Manuel Palacios Villanueva, Fracc. Punta Juriquilla (MX); Garry F. Webb, Monterrey (MX)

(73) Assignee: Unimin Corporation, New Canaan, CT (US)

( * ) Notice: Subject to any disclaimer, the term of this patent is extended or adjusted under 35 U.S.C. 154(b) by 264 days.

(21) Appl. No.: 12/651,605

(22) Filed: Jan. 4, 2010

(65) Prior Publication Data
US 2010/0204035 A1    Aug. 12, 2010

Related U.S. Application Data

(60) Provisional application No. 61/151,261, filed on Feb. 10, 2009.

(51) Int. Cl.
C04B 33/00    (2006.01)
C04B 33/24    (2006.01)
C04B 14/04    (2006.01)

(52) U.S. Cl. .................. 501/141; 501/144; 106/486

(58) Field of Classification Search .......... 501/130, 501/131, 141–144; 106/486
See application file for complete search history.

(56) References Cited

U.S. PATENT DOCUMENTS

| | | | | |
|---|---|---|---|---|
| 4,812,427 A | * | 3/1989 | Kohut | 501/148 |
| 4,880,759 A | * | 11/1989 | Kohut | 501/148 |
| 5,153,155 A | * | 10/1992 | Kohut | 501/141 |
| 6,696,377 B1 | * | 2/2004 | Thomas | 501/148 |
| 7,105,466 B2 | | 9/2006 | Thomas | |

OTHER PUBLICATIONS

Technical Data Sheets (2 pages), Starcast Ceramic Casting Ball Clays, Gleason, TN, Jul. 2007.
Technical Data Sheets (2 pages), Premiere Pressing Clays, Troup, TX, Jul. 2008.

* cited by examiner

*Primary Examiner* — Noah Wiese
(74) *Attorney, Agent, or Firm* — Rankin, Hill & Clark LLP

(57) ABSTRACT

A blend of ball clays for use as the ball clay component of a slip to produce a ceramic sanitary ware item by a slip casting process. The clay blend including 20-50 percent of a fine-grained ball clay with a low carbon content and 45-55 percent of its particles having a size less than 0.5 microns and about 85-95 percent of the particles less than about 20 microns.

26 Claims, 4 Drawing Sheets

| | CLAY A | CLAY B | CLAY BLEND | |
|---|---|---|---|---|
| 20 MICRON | 90-93 | 88-91 | 89.5-92.5 | |
| 10 MICRON | 82-85 | 83-86 | 82-85 | |
| 5 MICRON | 70-75 | 75.5-80.5 | 51.2-76.6 | % FINER |
| 2 MICRON | 49-55 | 65-70 | 49.3-55.3 | |
| 1 MICRON | 37-43 | 54.5-60.5 | 42.2-48.2 | |
| 0.5 MICRON | 26-32 | 45.5-51.5 | 31.8-37.8 | |
| % CARBON | 0.200-0.700 | 0.075-0.150 | 0.160-0.550 | |
| MOR (PSI) | 300-450 | 500-700 | 350-500 | |
| CAST RATE (GRAMS) | 50-70 | 30-50 | 45-55 | |

FIG. 2

| SLIP | PERCENTAGE / WT. |
|---|---|
| CLAY A | 24.50 |
| CLAY B | 10.50 |
| KAOLIN | 14.00 |
| FELDSPAR | 43.00 |
| SILICA | 8.00 |

FIG. 3

| SLURRY | |
|---|---|
| CLAY A | 50-80 % WT |
| CLAY B | 20-50 % WT |

FIG. 7

| SLIP | |
|---|---|
| BLEND | 32 - 42 % WT |
| KAOLIN | 8 - 18 % WT |
| FELDSPAR | 37 - 45 % WT |
| SILICA | 5 - 13 % WT |
| CLAY A | 21 - 34 % WT |
| CLAY B | 8 - 21 % WT |
| SOLIDS CONTENT | 40-80 % WT |

FIG. 8

HIGH STRENGTH CLAY BLEND FOR SANITARY WARE

This application claims priority based upon pending provisional application Ser. No. 61/151,261, filed Feb. 10, 2009 and this provisional application is incorporated by reference herein as a part of this specification.

The present invention relates to the art of producing sanitary ware by the slip casting process and more particularly to a high strength blend of essentially two clays that increases the strength of the pre-fired casting, while substantially reducing the slip cost without adversely affecting the casting characteristics of the slip.

BACKGROUND OF INVENTION

In producing sanitary ware as opposed to flat ceramic ware, the pre-fired casting is produced normally by a slip casting process wherein a slip is introduced into the mold and forms a body conforming to the internal shape of the mold. After a given time, the slip forms or casts into the desired shape and the remaining slip is removed or drained from the mold. A slip for sanitary ware is formed from a special coarse-grained clay or group of clays normally having a maximum grain size of about 20 microns. Maximum grain or particle size means about 90 percent of the particles are less than 20 microns. The coarse particle characteristic is determined by the amount of particles with a percentage finer than 5 microns, 2 microns, 1 micron and 0.5 micron. These finer grain size characteristics are a measurement of the coarse-grained clay or clays used in forming a slip. The clay or clays are combined with other constituents of the slip. The other constituents are normally kaolin, feldspar and silica, which is often ground silica. Use of a coarse-grained clay for the slip is standard practice because the resulting slip must have a desired rheological behavior together with a relatively high modulus of rupture (MOR) in the green condition. Furthermore, the slip must be such that the drain of the mold is maintained clean and the constituents of the slip must have a relatively low organic content. Low carbon content results in less defects in the glaze and increases the whiteness of the fired ceramic ware. It has been found that coarse-grained clays in the slip results in a desired casting process together with desired drying, glazing and firing attributes of the procedure for making sanitary ware. Because of the resultant characteristics mentioned above attributed to the use of coarse-grained clays having a relatively low amount of particles below 0.50 microns, the sanitary ware industry has heretofore uniformly used a coarse-grained clay or clays for the slip used in making sanitary ware.

At one time, it was suggested that the casting slip for sanitary ware casting should have high percentage of particle size above 45 microns, a substantially larger particle size than normally used for sanitary ware. Producing a casting slip having such larger particle size coarse-grained clay is disclosed in Thomas U.S. Pat. No. 7,105,466, which is incorporated by reference herein for general technical information. This patent describes procedures for increasing the particle size of the coarse-grained clays used for casting slips to cast sanitary ware. Indeed, several general characteristics of a casting slip used for sanitary ware is described in this patent, even though it is directed to the irrelevant concept of using larger particle size coarse-grained clay for the slip. This patent does not describe background for the present invention; but, it does explain certain terms and characteristics of casting slips used in sanitary ware. The clay or clays of this prior patent are not the traditional clay used in sanitary ware production, but a clay blend having even larger particle size. The clay used for sanitary ware and to which the present invention is directed is different. The ball clay forming the background of the invention has a limited maximum particle size and less than about 30 percent of its particles with the particle size less than 0.5 microns. This type clay is the coarse-grained clay used in sanitary ware production and forming the background of the present invention. Such coarse-grained clay is traditionally used for making sanitary ware is a clay of the type sold by Unimin Corporation of New Canaan, Conn. under the trademark STARCAST XL. The slip for sanitary ware uses this type of coarse-grained ball clay together with kaolin, feldspar and silica to produce a traditional slip for making sanitary ware. Thus, this type slip constitutes the technical background to the present invention. The invention is not related to increasing the maximum particle size of the traditional coarse-grained ball clay as suggested in Thomas U.S. Pat. No. 7,105,466. To the contrary, the present invention modifying the traditional coarse-grained ceramic casting ball clay used in producing sanitary ware blended by adding a "pressing" clay. This modifying clay results in a clay blend that increases the strength of the casting and decreases the cost of the slip without substantially affecting the casting characteristics of the prior slip using traditional coarse-grained clay for the specific purpose of producing sanitary ware.

STATEMENT OF INVENTION

The present invention relates to the concept of modifying the traditional casting ball clay used in a slip for producing sanitary ware by blending with the traditional ball clay a fine-grained pressing ball clay that surprisingly increases the strength of the slip, without decreasing the effectiveness of the slip in producing quality sanitary ware. The strength increasing blend creates a slip with all the processing characteristics of using the traditional coarse-grained casting clay. The discovery of the unique combination of ball clays for a slip used in the production of sanitary ware that not only increases the strength of the formed casting during the slip casting process, but also substantially reduces the cost of the ball clay component of the slip. This unique and novel combination of two different ball clays for sanitary ware improves the green strength (MOR), improves the slip drainage and also improves the fired color of the ceramic ware. The increased green strength is important in that it allows for more freedom of handling the unfired casting. Consequently, the possibility of cracks and rejections of the castings is decreased. By improving the drain characteristics of the slip produced by the novel combination of two different ball clays results in an improvement in the accumulation of the slip on the walls of the mold during the casting process. This specific advantage of using the unique and novel clay blend of the present invention also reduces the creation of unwanted cracks during the subsequent drying stage in producing sanitary ware. The unique and novel combination of two different ball clays not only maintains the desirable molding characteristics associated with the prior use of merely coarse-grained casting clay, but also improves the fired color so the resulting ceramic product is a whiter body. This improved color characteristic created by using the novel blend of two different ball clays allows for better development of the ceramic glazes used for decorative purposes in manufacturing sanitary ware. Consequently, the unique combination of two different ball clays not only results in the beneficial processing characteristics experienced in the past, but also improves the performance of the slip in producing sanitary ware.

Importantly, the novel clay blend drastically reduces the cost of the slip used in this specific manufacturing procedure.

In accordance with the invention there is provided an improved blend of different ball clay, which novel blend is used as the ball clay component of the slip to produce a ceramic sanitary ware item. This clay blend is novel in that it includes 20-50 percent of a fine-grained pressing ball clay with a low carbon content, whereas the traditional coarse-grained casting ball clay has a relatively high organic or carbon content. The fine-grained pressing clay added to the ball clay component of the slip has 45-55 percent of its particles with the size less than 0.5 microns. As is known, the amount of particles finer than 0.5 microns is indicative of coarseness of the ball clay. The novel blend constituting the present invention includes the traditional casting ball clay modified by inclusion of a fine-grained pressing ball clay. Both of these ball clays have a maximum grain size in the general neighborhood of 20-30 microns with the traditional casting ball clay being coarse-grained and having a medium particle size substantially above 5 microns. The present invention incorporates a fine-grained ball clay wherein about half of the particles are finer than 0.5 microns. The presence of a large amount of particles with a particle size of less than 0.5 microns is indicative of ball clays in general. The relationship of the number of particles in the ball clay finer than this bench mark size is clearly indicative of the coarseness or fineness of the ball clays used in the present invention. Not only does the modifying fine-grained ball clay have a substantial amount of its particles of 0.5 microns but also at least 75 percent of the particles are less than 5 microns. Furthermore, the fine-grained ball clay used to modify the ball clays for the slip of ceramic ware have a MOR greater than 450 psi and preferably greater than about 500 psi. Consequently, the invention involves a blend of two different ball clays, wherein the traditional ball clay for ceramic sanitary ware is modified by the inclusion of 20-50 percent of a fine-grained pressing ball clay.

As indicated above, the modifying fine-grained ball clay used in the novel blend has a low carbon content, which content is generally less than about 0.20 percent. The added ball clay has a casting rate in the general range of 30-50 grams. Indeed, the carbon content of the fine-grained ball clay used to modify the blend for slip casting is in the general range of 0.70 to 0.15 percent.

In accordance with another aspect of the present invention, the fine-grained ball clay used to modify the clay blend for the slip casting process has about 75 percent of the particles in the modifying clay being less than about 5 microns. Thus, the fine-grained clay is primarily less than 0.5 microns and only about 25 percent of the particles are greater than 5 microns. This is a fine-grained ball clay used for processing flat items, such as Premiere XL sold by Unimin Corporation of New Canaan, Conn.

Yet another aspect of the present invention is an improvement in the casting slip by adding the distinctly different fine-grained ball clay to the traditional casting ball clay, which discovery results in a blend of ball clays having an MOR greater than about 350 psi and in the general range of 350-500 psi. The casting rate of the blend itself is greater than 45 grams and generally in the range of 45-55 grams. Thus, the strength imparted to the finished product of the blend of the present invention is substantially greater than the strength resulting in merely using a coarse-grained casting ball clay, as heretofore used in sanitary ware production.

In accordance with another aspect of the present invention, there is provided a novel clay blend having essentially only two ball clays; however, minor amounts of other clays could be added. Minor amounts means no greater than about 5-10 percent of the blend. In accordance with still another aspect of the present invention the ball clay used to modify the clay constituents of a slip is a gray to black clay containing lignite and siderite.

The invention involves the blend of two different clays used in producing a slip for slip casting of sanitary ware. However, another aspect of the invention is the slip itself which has 30-45 percent by weight of the novel blend of clays, as defined above. The solid content of the novel slip is in the range of 40-80 percent by weight of the slip. In accordance with standard technology, the slip includes kaolin, feldspar and/or silica. The amount of kaolin is in the range of 8-18 percent by weight of a slip. The amount of feldspar of the slip is in the range of 37-45 percent by weight of a slip. The amount of silica is in the range of 5-13 percent by weight of the slip. Indeed, the amount of fine-grained ball clay in the slip is in the range of 8-21 percent of the slip.

In accordance with another aspect of the invention, there is provided a novel sanitary ware item made from the slip as defined above. Furthermore, a slurry of the novel clay blend constitutes a novel slurry for use in producing a slip for sanitary ware production. This slurry includes an inorganic electrolyte, preferably sodium silicate. It is common practice to form the slurry which is transported to the facility making the sanitary ware. There the slip is formed.

The slip of the present invention has been measured with a Brookfield Viscometer. This viscometer measures characteristics referred to as "BU" and "CCR" in accordance with standard testing techniques. The slip of the present invention results in the measured BU minus the measured CCR being a value in the general range of 5.8 to 8.0. This is a test of acceptable viscosity of the slip.

In accordance with still another aspect of the present invention, the modifying fine-grained clay developed as the novel aspect of the present invention has a carbon content in the general range of 0.1 to 0.3 percent and an MOR in the general range of 500-800 psi. These properties produce a stronger slip comprising the novel discovery of fine-grained ball clay added to traditional coarse-grained clay to produce the novel clay blend of the present invention. The fine-grained ball clay also includes at least 60 percent silica dioxide and at least 24 percent aluminum dioxide. The slip of the present invention has a density in the general range of 1.7 to 2.0 gr/cm$^3$.

In practice, the present invention is a blend of two distinctly different clays used for slip casting, wherein the coarse-grained clay is Starcast LX and the fine-grained, blend modifying ball clay is Premiere BL clay.

The primary object of the present invention is the provision of a blend of distinctly different ball clays used in the slip for manufacturing sanitary ware, which novel blend does not adversely affect the casting characteristics of the slip, but increases the strength and reduces the cost of the slip.

Yet another object of the present invention is the provision of a blend, as defined above, which blend is a traditional coarse-grained casting clay, modified by the inclusion of a less expensive, fine-grained clay that has been discovered to increase the strength for the resulting casting and obtain the advantages discussed herein.

Still a further object of the present invention is the provision of a slurry, slip and sanitary ware using the novel ball clay blend constituting the primary aspect of the present invention.

These and other objects and advantages will become apparent from the following description taken together with the accompanying drawings.

BRIEF DESCRIPTION OF DRAWINGS

FIG. 2 is a table illustrating physical characteristics of the traditional sanitary ware ball clay, the discovered fine-grained ball clay used to modify the traditional clay and the resulting novel blend of the invention;

FIG. 3 is a table illustrating the constituents of the slip forming the preferred embodiment of the present invention;

FIG. 7 is a table disclosing the amount of clays forming a slurry in accordance with the present invention; and, FIG. 8 is a table similar to the table of FIG. 3 but illustrating the general range of the constituents and the solid content of a slip formed in accordance with the present invention.

PREFERRED EMBODIMENT

Figure 4:
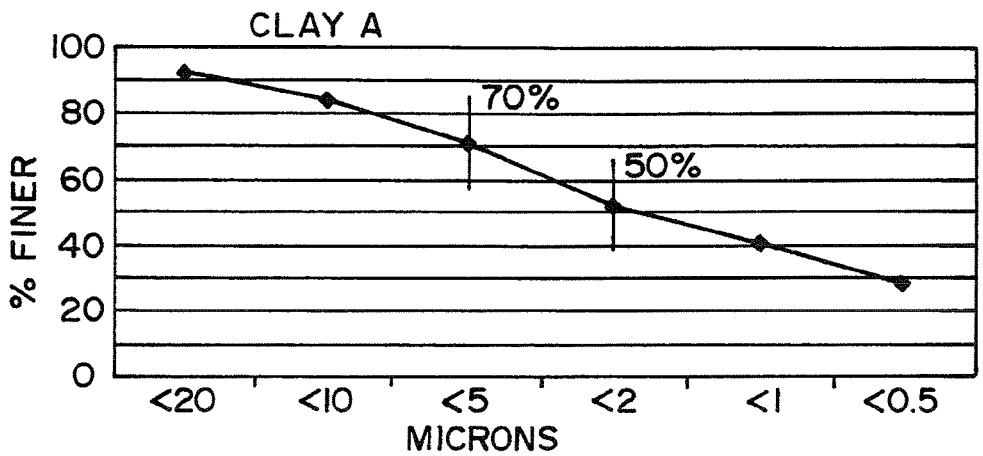
FIGS. 4-6 are particle size distribution graphs of the two clays combined to form the novel blend in one embodiment of the present invention and the particle size distribution of the blend itself.
Figure 5:
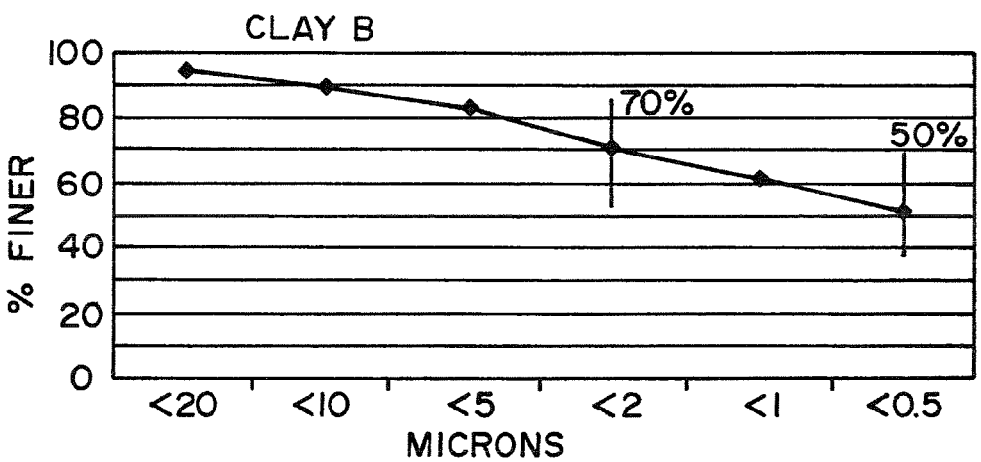
Figure 6:
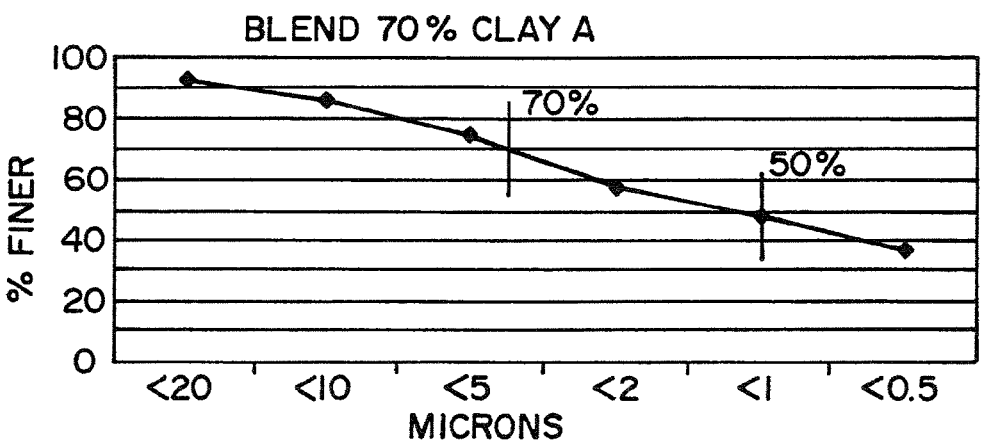

The invention relates to the discovery that the ball clay constituent of a slip used in producing white sanitary ware can be improved in a manner heretofore not realized in the sanitary ware technology. In making sanitary ware, the traditional clay constituent of the slip is a coarse-grained "casting" ball clay having generally all of the particles with a size less than 20 microns but only about 25-30 percent of the particles less than 0.5 microns. "Generally all" or maximum grain size means at least about 90 percent of the particles are finer than the stated size. This coarse-grained clay has resulted in quite satisfactory casting characteristics for the white sanitary ware industry. It was believed that the use of coarse particles in the clay constituent created better strength, draining, and definitely better theology. Consequently, heretofore the clay constituent of the slip used for sanitary ware has been coarse-grained "casting" ball clay, wherein modifications have only been suggested in the area of increasing the grain size characteristics of the ball clay constituent. Completely contrary to this technology, the present invention involves the discovery that the ball clay constituent of the slip for sanitary ware can be improved in the area of strength without substantially affecting the casting characteristic associated with traditional coarse-grained ball clay in the slip. The discovery was the inclusion of the substantial portion of a fine-grained "pressing" ball clay into the ball clay constituent of a slip. The clay constituent is a blend of the traditional coarse-grained casting ball clay with 20-50 percent of the modifying fine-grained pressing ball clay. The discovery that a blend of traditional coarse-grained clay modified by a fine-grained clay has resulted in a slip casting for sanitary ware. This is less expensive and has better strength. The novel clay constituent of the slip is a clay blend as set forth in the right column of FIG. 2. This disclosed clay blend is a combination of coarse-grained clay A modified by a fine-grained clay B. The particle size distribution of traditional clay A heretofore used in making sanitary ware and the modifying fine-grained clay B is set forth in the first and second columns of FIG. 2. As can be seen, both of the clays have a relatively identical upper grain size, which is 90 percent of the particles finer than about 20 microns. Of course, this parameter means that the grain size of the clays trails off above 20 microns. However, only the 20 microns size is relevant and reported. The two clays each have substantially less than 10 percent particles greater than 20 microns. This is defined as an upper particle size for the two clays. Consequently, the upper particle sizes are substantially the same. However, relevant ball clays are generally defined by their percentage of particles in the lower area of the particle size distribution. The coarse-grained ball clays have a relatively low amount of particles less than 0.5 microns. This is shown as the particle size distribution of clay A. The modifying fine-grained clay B has a substantially increased amount of particles finer than 0.5 microns. Indeed, clay B has a range of about 35-55 percent of particles with a size less than 0.5 microns. Furthermore, the fine-grained modifying ball clay of the blend has more than 75 percent of the particles less than 5 microns. As is well known, ball clay is generally classified according to the particle size distribution of particles with a size less than 5 microns and importantly the particles with a size less than 0.5 microns. Consequently, clay A is a "coarse-grained" ball clay and clay B used to modify the characteristic of clay A is a "fine-grained" ball clay. The distinguishing particle size distributions are shown in FIG. 2. Furthermore, traditional clay, i.e. clay A, used in making sanitary ware has a relatively high amount of organic matter. This property is indicated by the percent of carbon in clay A. Clay B has substantially less carbon or organic content. As a further distinction in the two clays, clay B has a substantially higher Modulus of Rupture (MOR) but a somewhat lower casting rate. These two properties are also disclosed in the table of FIG. 2. The clay blend has the composite properties disclosed in FIG. 2 when clays A and B are combined as taught by the disclosure of the table constituting FIG. 7. FIGS. 4-6 illustrate the particle size distribution of clay A, clay B and of the blend when using 70 percent of clay A. As can be seen, the blend has about 70 percent of the particles less than 5 microns in the example used in constructing the sample with properties disclosed in FIGS. 4, 5 and 6.

By mixing the novel clay blend of the present invention with water, a slurry is created into which is added a defloculant, such as an inorganic electrolyte. The preferred inorganic electrolyte is sodium silicate. By blending clay A and clay B in water with an appropriate amount of defloculant, a slurry is made so it can be shipped for use as the clay constituent of a slip used in slip-casting white sanitary ware. The preferred example of the slip is disclosed in the table of FIG. 3. The blend of clay A and B forms the clay constituent of the slip. In accordance with standard practice, kaolin, feldspar and silica are also included in the slip. The amount of the various slip constituents in the preferred example are disclosed in the table of FIG. 3. The table of FIG. 8 discloses the range of these constituents that are used to make a novel slip formed in accordance with the present invention. The table of FIG. 8 also discloses the solid content for the slip, as well as the ratio of clay A and clay B for use in constructing a slip using the present invention.

Figure 1:
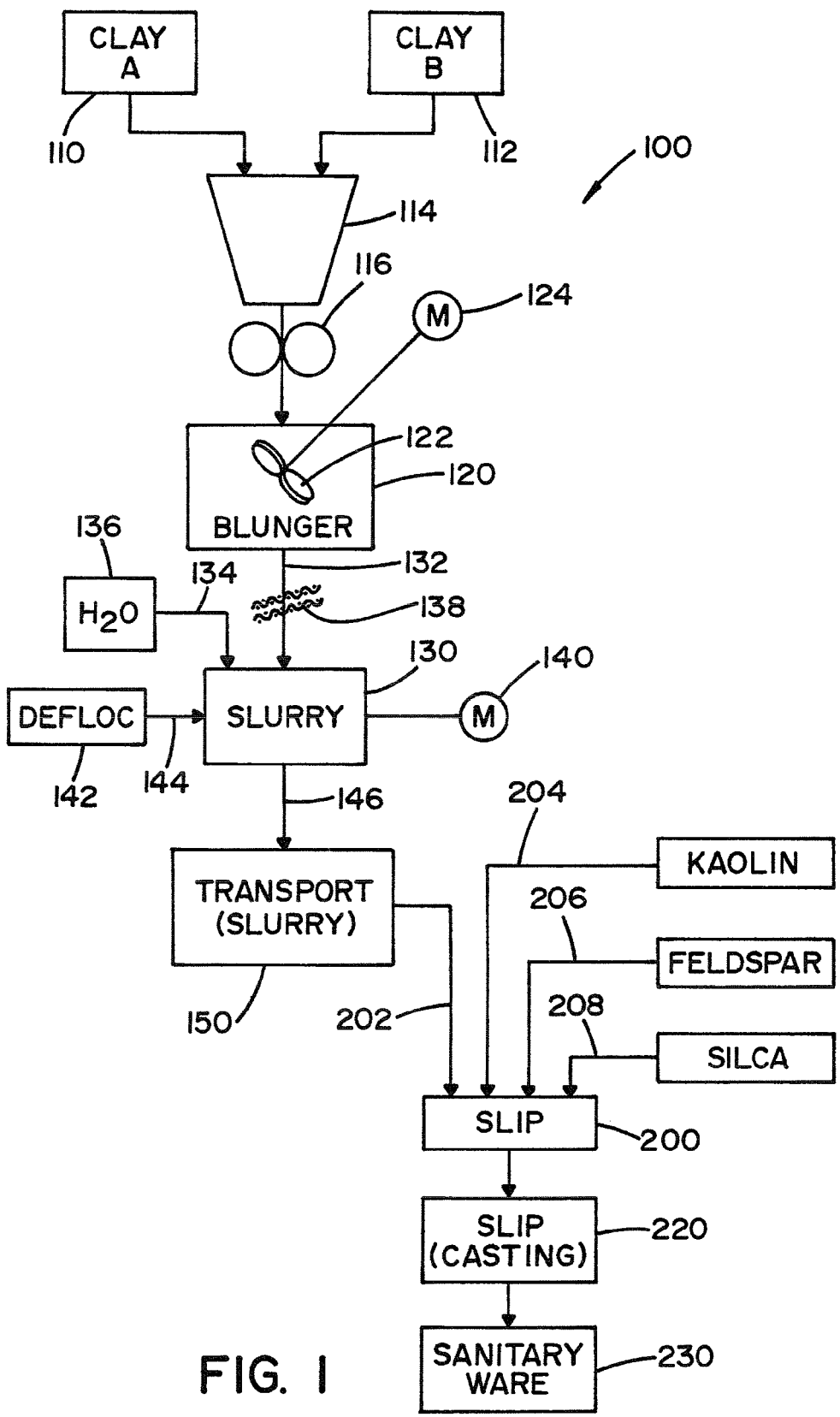
FIG. 1 is a schematic flow chart showing the method for producing the clay blend, slurry and slip constituting the present invention.

Turning now to FIG. 1, the discovery of the present invention utilizes a method of production schematically illustrated in FIG. 1, wherein method 100 includes a bin 110 containing traditional coarse-grained ball clay, referred to in the disclosure as clay A. A second bin 112 includes the blend modifying fine-grained ball clay referred to as clay B. These two distinctly different clays are directed into hopper 114 in a ratio selected from the table in FIG. 7. Hopper 114 contains the clay blend of 50-80 percent clay A. This novel clay blend is then passed through a crushing roll or stage 116 and is fed into blunger 120, where the blend is mixed by a mechanism schematically illustrated as blade 122 driven by motor 124. Thereafter, the novel clay blend is passed to slurry container 130 through line 132 where the large particles are removed by screen 138. In practice screen 138 has a size of generally 325 mesh. The particles in container 130 are, thus less than 44 microns and generally less than 20 microns as disclosed in the table of FIG. 2. In the table, 85-95 percent of the particles are less than 20 microns in accordance with standard technology. A few of the particles may be as high as 35 or 40 microns. Slurry container 130 mixes the novel clay blend of the present invention with water from line 134 connected to water supply 136. The amount of water used to form a slurry of the novel blend is well within the knowledge of technicians in this particular art. Slurry container 130 is blended and mixed by motor 140 after an appropriate amount of deflocculant, such as sodium silicate, from supply 142 is directed into container 130 by way of line 144. After the slurry has been formed, it is directed through line 146 to transport stage 150, which is normally containers of various size. Such containers are then shipped or transferred to a sanitary ware manufacturing facility where a slip having the constituents disclosed in the tables of FIGS. 3 and 8 is produced in mixer 200. The resulting mixture or slip includes the novel slurry having the novel clay blend directed through lines 202 to mixer 200. In a like manner, kaolin is directed to the mixer by line 204, feldspar is directed to the mixer through line 206 and silica, whether crushed or otherwise, is directed to the mixer through line 208. After the slip has been formed and blended, it is then used in a slip casting process represented by block 220 to produce a novel sanitary ware indicated by block 230.

Example

In making sanitary ware ceramic products, coarse-grained casting ball clay is universally used. This clay is used for its mineralogical characteristics, such as relatively high content of organic matter, its particle size distribution, its rheological behavior and its rupture modulus. The fine-grained clay discovered for use in making the present invention has heretofore been used in the ceramic area only for floor tiles and castings because of its low content of organic matter, particle size distribution, light firing color and mineralogical composition. In making a slip as disclosed in the table of FIG. 3, the traditional clay A was Starcast LX clay and clay B was Premiere BL clay. The kaolin was Starcast K CR kaolin, while the feldspar was FAS-203 and the silica was SSJ-202 A. When a sample load was prepared using these constituents, necessary adjustments were made with the minimum necessary amount of deflocculant at a density of 1.80 gr/cm$^3$. This slip had the CCR and the BU values measured by a Bookfield Viscometer. These values were slightly below the traditional parameters where CCR=9.5 and BU=15. The measured CCR was 5.6 and the measured BU was 9.0. When a larger amount of this slip was produced, the CCR measurement was 8.3 and the BU measurement was 14.2. These were generally within the traditional parameters of the acceptable slip made only with traditional clay A. It was found that when a slurry was stored at room temperature for a 15 day period, the CCR was increased to 9.3 and the BU value was increased to 16.5. Consequently, slip formed from the constituents in the table of FIG. 3 had the viscosity characteristics of acceptable slip for slip casting of sanitary ware items. Indeed, when subtracting the CCR value from the BU value as read by the Bookfield Viscometer, the difference was 7.2. In the white ware ceramic industry for making sanitary ware, it is normally considered acceptable for this difference to be in the general range of 5.8 to 8.0. Consequently, the sample slip constructed of the novel clay blend constituting the discovery of the present invention was well within the viscosity demands of sanitary ware. It was found that the novel slip defined in FIG. 3 had a clean drainage and 50 sanitary ware pieces were slip cast using this sample slip. There was no accumulation of slurry or slip in the walls of the 50 pieces. No defect considered critical to a fired ceramic body was created in the 50 case pieces. The slip maintained acceptable levels of body thickness and no cracks were observed when using this slip in making the 50 green pieces for firing into ceramic sanitary ware. The slip casting of these 50 pieces were cast at a temperature of 26° C. The thickness formation time was one hour. It is projected that this time would be somewhat reduced if the casing temperature of the casting was increased to the normal level of the 29° C. to 45° C. as used in the sanitary ware industry. These 50 pieces made by the slip disclosed in FIG. 3 were then dried without the presence of any cracks. After drying, the 50 pieces were enameled and fired at a temperature of 1200° C. in a continuous furnace at a cycle approximately 10.5 hours. Later, once the fired cycle was over, the pieces were inspected and only one cracked piece was noted. This was less than the number normally experienced in the industry. This crack was such that it could be easily retouched and refired into an acceptable sanitary ware piece or item. The green MOR was 3.5 kg/cm$^3$. This value is better than generally experienced in the sanitary ware industry. Furthermore, the total final contraction of the pieces was generally 10.5 cm which is similar to the value obtained in the industry. From the test of these 50 pieces using the slip of FIG. 3, the casting process had good rheological behavior in the area of viscosity, casting rate and density. The stability of the slip was maintained without flocculation. The demand for a deflocculant, such as sodium silicate, was not affected by the incorporation of clay B into the blend. There is no additional cost to the manufacturer of using clay B in the casting slip. The green casting was highly acceptable in the area of Rupture Modulus (MOR). This strength characteristic is above the strength currently available in the ceramic industry. Consequently, by using the clay blend of the present invention, it is safer to handle the pieces before and after the drying stage of the slip casting process. The behavior of the slip in the casting stage for the 50 pieces was quite satisfactory. The casting process permitted a clean drainage, without the accumulation of slip on the walls of the piece and subsequent generation of cracks in the drying stage of the process. The firing color of the ceramic bodies using the novel slip was considerably whiter than obtained in cast bodies traditionally experienced in the industry. Such color allows the producer in the sector to obtain a better development of their enamels when using the novel blend of the present invention. The low content of organic matter in the novel clay blend improves the degassing process inside the firing furnace. This advantage considerably reduces the presence of defects in the enamel after the drying process of the sanitary ware and before the pieces are fired.

Clay B used in modifying the clay constituent of the slip is a Kaollinitic type clay with low levels of organic material. This clay is composed mineralogically of illite and smectite. Due to the low organic content, surface area and mineralogical content, this clay is difficult to flocculate in traditional processes using sodium silicate. For these reasons, and others, clay B is used only for a pressing or extrusion process. Such processes use faster firing cycles and higher MOR to ensure the integrity of the ware during transportation. Clay B is not considered as a clay to be used for sanitary ware. It is not considered as the clay to be used in a slip casting process.

The slip set forth in FIG. 3 was used in producing 50 pieces, as described above; however, the invention as it relates to the slip with the range of components disclosed in table of FIG. 8. These ranges have proven successful.

Specific Clays

In the slip disclosed in the table of FIG. 3 and used to produce the 50 pieces discussed above, clay A was a typical clay used in slip casting of sanitary ware. The key physical property of this clay is its coarse particle size distribution in the 1 micron particle size and below. This particle size distribution is required to create a broad particle size distribution when combined with clay B to create a ball clay faction or blend in a slip formula that exhibits good casting characteristics. Clay A helps the blend to obtain the desired casting rate, as well as plasticity, shrinkage and Modulus of Rupture. Such typical "casting" clay is Starcast XL sold by Unimin Corporation of New Canaan, Conn. This coarse-grained ball clay has about 65 percent silica dioxide and 21 percent aluminum oxide. It has a loss of ignition of 8.7 and a carbon content of about 1.0 percent. The pH at 10% solids is about 5.0 and the MOR is about 425. This clay has 92 percent of its particles less than 20 microns with 71 percent of its particles less than 5 microns and 29 percent of its particles less than 0.5 microns. As defined in the claims, clay A has less than 30 percent of its particles with a particle size less than 0.5 microns. Clay A is "coarse-grained". It has a carbon content of at least 0.8 percent and MOR of less than 500 psi. This defines the characteristics of Starcast XL as the example of clay A.

In practice, clay B is a "pressing" clay sold by Unimin Corporation under the trademark Premiere. This clay has about 60 percent silica dioxide and about 26 percent aluminum oxide. The MOR value is 730 and the pH at 10% solids is about 0.40. Its carbon content is about 0.3 percent. Indeed, it has the sulfur content of 0.2 percent. Clay B has a loss of ignition in the range of 8.8-10.0, a carbon content in the range of 0.1 to 0.3 percent, and MOR in the range of 500-800 psi.

When using these two specific clays in a blend for a slip, the BU measurement by a viscometer minus the CCR measurement of the viscometer is in the general range of 5.8 to 8.0. This refines the specific clays that have been used in practicing the present invention and used in making the 50 pieces discussed in this disclosure; however, the blend is as defined in the appended claims.

Specification sheets for the "pressing" ball clay used as clay B and the traditional "casting" ball clay used as clay A in the preferred embodiment of the present invention are incorporated by reference herein.

The invention claimed is:

1. A blend of ball clays for use as the ball clay component of a slip to produce a ceramic sanitary ware item by a slip casting process, said clay blend including 20-50 weight percent of a fine-grained ball clay having a carbon content of less than 0.20 weight percent, 45-55 weight percent of its particles having a size less than 0.5 microns and about 85-95 weight percent of the particles having a size less than about 20 microns.

2. The blend as defined in claim 1, wherein said fine-grained ball clay has a MOR greater than 450 psi.

3. The blend as defined in claim 1, wherein the casting rate of said fine-grained clay is in the range of 30-60 grams per hour.

4. The blend as defined in claim 1, wherein said carbon content is in the range of 0.07 to 0.15 weight percent.

5. The blend as defined in claim 1, wherein the MOR of the blend is greater than about 350 psi.

6. The blend as defined in claim 1 wherein the casting rate of the blend is in the range of 45-55 grams per hour.

7. The blend as defined in claim 1, wherein the casting rate of the blend is greater than about 45 grams per hour.

8. The blend as defined in claim 1, wherein said blend includes only two ball clays as characteristic contributing clays where characteristic contributing is defined as a clay amounting to greater than 5-10 weight percent of said blend.

9. A blend as defined in claim 1, wherein the clay blended with said fine-grained clay is a coarse-grained clay of the type traditionally used in slip casting of sanitary ware.

10. A slip using the clay blend as defined in claim 1, wherein 30-45 weight percent by weight of said slip is said blend.

11. The slip as defined in claim 10, wherein the solids content of said slip is in the range of 40-80 weight percent by weight of said slip.

12. The slip as defined in claim 10, including at least one of kaolin, feldspar and silica.

13. The slip as defined in claim 12, wherein said kaolin is in the range of 8-18 weight percent by weight of the slip.

14. A slip as defined in claim 12, wherein said feldspar is in the range of 37-45 weight percent by weight of the slip.

15. A slip as defined in claim 12 wherein said silica is in the range of 5-13 weight percent by weight of the slip.

16. The slip as defined in claim 12, wherein said fine-grained ball clay is in the range of 8-21 weight percent of the slip.

17. The slip as defined in claim 10, wherein said fine-grained ball clay is in the range of 8-21 weight percent of the slip.

18. A slurry formed from the blend defined in claim 1.

19. The slurry as defined in claim 18 including an inorganic electrolyte.

20. The slurry as defined in claim 19, wherein said inorganic electrolyte is sodium silicate.

21. The blend as defined in claim 1 wherein said fine-grained ball clay includes at least 60 weight percent silicon dioxide and at least 24 weight percent aluminum dioxide.

22. The slip as defined in claim 10 having a density of 1.7 to 2.0 g/cm$^3$.

23. A blend of ball clays for use as the ball clay component of a slip to produce a ceramic sanitary ware item by a slip casting process, said clay blend including (a) 20-50 weight percent of a fine-grained ball clay, and (b) a coarse-grained ball clay having less than 30 weight percent of its particles with a particle size less than 0.5 microns, and a carbon content of at least about 0.8 weight percent and an MOR of less than 500 psi.

24. A blend of ball clays for use as the ball clay component of a slip to produce a ceramic sanitary ware item by a slip casting process, said clay blend including 20-50 weight percent of a fine-grained ball clay, 45-55 weight percent of its particles having a size less than 0.5 microns and about 85-95 weight percent of the particles having a size less than about 20 microns, wherein the MOR of the blend is in the range of 350-500 psi.

25. A blend of ball clays for use as the ball clay component of a slip to produce a ceramic sanitary ware item by a slip casting process, said clay blend including 20-50 weight percent of a gray to black clay containing lignite and siderite, 45-55 percent of its particles having a size less than 0.5 microns and about 85-95 weight percent of the particles having a size less than about 20 microns.

26. The blend as defined in claim 25, wherein the MOR of the blend is in the range of 350-500 psi.

* * * * *